(12) United States Patent
Panje et al.

(10) Patent No.: US 11,778,014 B2
(45) Date of Patent: Oct. 3, 2023

(54) THROTTLING CONTENT DOWNLOAD IN ADAPTIVE HTTP LIVE STREAMING

(71) Applicant: ARRIS Enterprises, Inc., Suwanee, GA (US)

(72) Inventors: Krishna Prasad Panje, Bangalore (IN); Praveen Girish, Bangalore (IN); William P. Franks, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 1312 days.

(21) Appl. No.: 14/569,048

(22) Filed: Dec. 12, 2014

(65) Prior Publication Data

US 2016/0173553 A1   Jun. 16, 2016

(51) Int. Cl.

| | |
|---|---|
| *H04L 65/75* | (2022.01) |
| *H04L 67/02* | (2022.01) |
| *H04N 21/2343* | (2011.01) |
| *H04N 21/239* | (2011.01) |
| *H04N 21/262* | (2011.01) |

(Continued)

(52) U.S. Cl.
CPC ........... *H04L 65/762* (2022.05); *H04L 65/61* (2022.05); *H04L 65/613* (2022.05); *H04L 67/02* (2013.01); *H04N 21/2393* (2013.01); *H04N 21/23439* (2013.01); *H04N 21/26258* (2013.01); *H04N 21/6581* (2013.01)

(58) Field of Classification Search
CPC ... H04L 65/602; H04L 65/4069; H04L 67/02; H04L 65/61; H04L 65/762

USPC ........................................................ 709/219
See application file for complete search history.

(56) References Cited

U.S. PATENT DOCUMENTS

| | | | |
|---|---|---|---|
| 6,330,609 B1 * | 12/2001 | Garofalakis | H04Q 3/0066 709/229 |
| 7,702,590 B2 * | 4/2010 | Malik | G06F 21/10 705/51 |

(Continued)

FOREIGN PATENT DOCUMENTS

WO    2001084336 A1    11/2001

*Primary Examiner* — Jerry B Dennison
(74) *Attorney, Agent, or Firm* — Panitch Schwarze Belisario & Nadel LLC (57) ABSTRACT

Streaming content protocols typically provide playlists, a file that lists the location of each segment of a content stream. The playlist may change as the content server adds content to the content stream or because the length of the content stream continues to grow. Client devices periodically fetch the playlist, and are unaware whether the playlist has changed, and thus may needlessly use bandwidth repeatedly fetching the same playlist. Throttling content download o provides systems and methods for controlling the download of streaming content-related data according to the current status of the playlist and possibly also current bandwidth availability. Content server, by monitoring client device related playlist position and client device content buffer can regulate content streaming, to improve network bandwidth distribution. A content server determines whether the playlist has changed since the last time the playlist was requested and denies a request for the playlist when the playlist has not changed. Similar mechanisms can be employed to improve bandwidth usage by a server that is not aware of changes to the playlist.

20 Claims, 7 Drawing Sheets

(51) Int. Cl.
*H04N 21/658* (2011.01)
*H04L 65/61* (2022.01)
*H04L 65/613* (2022.01)

(56) References Cited

U.S. PATENT DOCUMENTS

| | | | | |
|---|---|---|---|---|
| 8,260,877 B2 * | 9/2012 | Biderman | H04N 7/17318 | 709/217 |
| 8,280,863 B2 * | 10/2012 | Pantos | H04N 21/26258 | 707/693 |
| 9,241,204 B2 * | 1/2016 | Li | H04L 27/00 | |
| 9,501,533 B2 * | 11/2016 | Coburn, IV | G06F 17/3053 | |
| 9,584,557 B2 * | 2/2017 | Panje | H04L 65/4084 | |
| 9,729,830 B2 * | 8/2017 | May, Jr. | H04N 7/17318 | |
| 10,749,761 B1 * | 8/2020 | Truax | H04L 41/509 | |
| 10,750,248 B1 * | 8/2020 | Haritaoglu | H04N 21/8456 | |
| 2001/0044851 A1 * | 11/2001 | Rothman | H04H 20/82 | 709/231 |
| 2002/0120925 A1 * | 8/2002 | Logan | A23L 2/52 | 725/9 |
| 2003/0018797 A1 * | 1/2003 | Dunning | G06Q 30/02 | 709/231 |
| 2005/0283535 A1 * | 12/2005 | Covell | H04L 29/06027 | 709/231 |
| 2006/0056324 A1 * | 3/2006 | Hyyppa | G06Q 20/123 | 370/310 |
| 2008/0117869 A1 * | 5/2008 | Freen | H04W 28/16 | 370/329 |
| 2008/0151751 A1 * | 6/2008 | Ponnuswamy | H04L 1/0017 | 370/232 |
| 2010/0058406 A1 * | 3/2010 | Xu | H04L 12/1881 | 725/97 |
| 2010/0169393 A1 | 7/2010 | Fruchter et al. | | |
| 2010/0169453 A1 | 7/2010 | Biderman et al. | | |
| 2011/0066703 A1 * | 3/2011 | Kaplan | H04L 65/4084 | 709/219 |
| 2012/0042090 A1 * | 2/2012 | Chen | H04L 65/752 | 709/231 |
| 2012/0054344 A1 * | 3/2012 | Udani | H04W 28/02 | 709/226 |
| 2012/0144445 A1 * | 6/2012 | Bonta | H04L 12/1868 | 725/116 |
| 2012/0191870 A1 * | 7/2012 | Pantos | H04N 7/17318 | 709/231 |
| 2012/0254456 A1 * | 10/2012 | Visharam | H04N 21/2343 | 709/231 |
| 2012/0263434 A1 * | 10/2012 | Wainner | H04N 21/812 | 386/E5.003 |
| 2012/0265853 A1 * | 10/2012 | Knox | H04N 21/2187 | 709/218 |
| 2012/0278496 A1 * | 11/2012 | Hsu | H04N 21/4381 | 709/231 |
| 2013/0091249 A1 * | 4/2013 | McHugh | H04L 65/60 | 709/219 |
| 2013/0174035 A1 * | 7/2013 | Grab | H04N 21/4316 | 715/716 |
| 2013/0254308 A1 * | 9/2013 | Rose | H04N 21/4882 | 709/206 |
| 2014/0052823 A1 * | 2/2014 | Gavade | H04N 21/26258 | 709/219 |
| 2014/0188975 A1 * | 7/2014 | Fujimori | H04L 65/60 | 709/202 |
| 2014/0258449 A1 * | 9/2014 | Holden | H04L 65/60 | 709/217 |
| 2014/0344468 A1 * | 11/2014 | Saremi | H04L 65/105 | 709/231 |
| 2015/0026309 A1 * | 1/2015 | Radcliffe | H04L 65/602 | 709/219 |
| 2015/0089557 A1 * | 3/2015 | Busse | H04N 21/8456 | 725/95 |
| 2015/0350704 A1 * | 12/2015 | Horen | G06F 16/40 | 725/95 |
| 2016/0021164 A1 * | 1/2016 | Chakarapani | G06F 16/783 | 709/224 |
| 2016/0173553 A1 * | 6/2016 | Panje | H04L 65/61 | 709/219 |
| 2017/0272790 A1 * | 9/2017 | Miles | H04N 21/238 | |
| 2018/0205778 A1 * | 7/2018 | Forman | H04N 21/2402 | |

\* cited by examiner

THROTTLING CONTENT DOWNLOAD IN ADAPTIVE HTTP LIVE STREAMING

BACKGROUND

The present disclosure relates generally to throttling content download in streaming content delivery and more specifically to managing requests for playlists and streaming content in order to reduce bandwidth usage.

Audiovisual content is commonly delivered from a remote location, over a network, to a client device capable of playing back the audiovisual content. The audiovisual content is frequently played back while it is being delivered, a process called streaming or live streaming. The streaming content is usually encoded and/or compressed, and segmented into chunks of data representing several seconds of playback.

Streaming content protocols typically provide a way to describe the segmented content. One method is to provide a playlist, which is usually—but not always—a text file that lists the Uniform Resource Identifiers (URI) or Uniform Resource Locator (URL) of each segment of a content stream, in the order that the segments should appear. Client devices fetch the playlist from the content server and then use the URIs or URLs to fetch each segment of content. The client device typically fetches the content segments faster than the content can be played back, so that the playback is seamless.

The content server may operate in either cumulative mode or in rolling mode. In cumulative mode, the server can create a playlist file and append URIs to the end of the playlist file. In rolling mode, the server may remove URIs identifiers from the beginning of the playlist file on a rolling basis, thereby providing a sliding window of media content accessible to a client device. The server can also add URIs to the playlist. The client device then periodically downloads updated copies of the playlist file to continue viewing the content stream.

The client device, however, lacks awareness of whether the playlist has changed. The client device may thus request the playlist and receive the same copy that it already has, thus unnecessarily using network bandwidth. The content server usually is aware of when the playlist has changed. The content server can be made to track when a client device has requested the playlist, and thus determine whether the at the time of a new request whether the playlist has changed since the last time the same client requested the playlist for the same content stream. Gateway servers that are not aware of changes to the playlist can use similar mechanisms, as well as awareness of client devices' playlists and content buffers, to improve network bandwidth usage.

The client device, lacks awareness of overall network bandwidth conditions. Gateway server, by monitoring client device related playlist position and hence client device content buffer can regulate content streaming, to improve network bandwidth distribution.

SUMMARY

In one embodiment, computer-implemented method for throttling content download is provided. The computer-implemented method comprises receiving a request for a playlist for streaming content. The computer-implemented method further comprises determining whether to send the playlist. The computer-implemented method further comprises responding to the request for the playlist.

In one embodiment, a computer-implemented method for throttling content download is provided. The computer-implemented method comprises receiving a request for streaming content-related data from a client device. The computer-implemented method further comprises determining how to respond to the request for the streaming content-related data. The computer-implemented method further comprises responding to the request for the streaming content-related data.

In one embodiment, an apparatus for throttling content download is provided. The apparatus comprises a processor and a memory coupled to the processor. The memory stores program instructions, which when executed from the memory cause the processor to receive a request for streaming content-related data from a client device. The program instructions, when executed from the memory, further cause the processor to determine how to respond to the request based on the monitored bandwidths. The program instructions, when executed from the memory, further cause the processor to respond to the request for the streaming content-related data.

FIGURES

The embodiments may be better understood by reference to the following description, taken in conjunction with the accompanying drawings as follows.

DETAILED DESCRIPTION

Audiovisual content is commonly delivered from a remote location, over a network, to a client device capable of playing back the audiovisual content. The audiovisual content is frequently played back while it is being delivered, a process called streaming or live streaming. Delivery of streaming content over a network requires adapting the data that represents the content for the network, including encoding and/or compressing the data to reduce its size. While not required, the content may also be delivered by way of a streaming protocol in order to improve continuity of the data, network bandwidth usage, and flexibility in delivering the content, among other reasons.

One protocol for delivering streaming content is HTTP Live Streaming (HLS). HLS is a Hypertext Transfer Protocol (HTTP) based media streaming communications protocol developed by Apple, Inc. of Cupertino Calif. The HLS protocol divides the content stream into a sequence of small HTTP-based file downloads, each download loading one short segment or chunk of a potentially unbounded transport stream. As the stream is played by a client device, the client device may select from a number of different alternate streams containing the same material encoded at different data rates, thus allowing the streaming session to adapt to the available data rate. At the start of the streaming session, the client device downloads an extended playlist containing the metadata for the various sub-streams that are available.

Since HLS requests use only standard HTTP transactions, HLS is capable of traversing firewalls and proxy servers that allow transit of standard HTTP traffic, unlike UDP-based protocols such as Real-time Transport Protocol (RTP or RTTP). Use of HTTP also allows content to be delivered over widely available content delivery networks.

HLS also specifies a standard encryption mechanism using Adaptive Encryption Standard (AES) and a method of secure key distribution using HTTPS, with either a device-specific realm login or an HTTP cookie. The combination provides a simple Digital Rights Management (DRM) system. HLS may also provide fast-forwarding, rewinding, and integration of subtitles.

Another protocol for delivery streaming content is Dynamic Adaptive Streaming over HTTP (DASH), also known as MPEG-DASH. MPEG-DASH is an adaptive bitrate streaming technique that enables high quality streaming of media content over the Internet, wherein the content is delivered from conventional HTTP web servers. MPEG-DASH divides the content into a sequence of small HTTP-based file segments, each segment containing a short interval of playback time that may be hours or indefinite in duration. The content is made available at a variety of bit rates, that is, the individual segments or chunks are encoded at different bit rates. As the content is played back by a client device that implements MPEG-DASH, the client automatically selects, from the alternatives, the next segment to download and play back, based on network conditions. Usually the client device selects the segment with the highest bit rate possible that can be downloaded without stalling or causing rebuffering of the playback. MPEG-DAHS thus adapts to changing network conditions, and attempts to avoid interrupts in the playback.

MPEG-DASH uses the existing HTTP web server infrastructure that is used for delivery of World Wide Web content. MPEG-DASH allows devices such as Internet connected televisions, set-top boxes, desktop computers, smart phones, tablets, etc., to receive and play multimedia audiovisual content from the Internet, and also adapt to Internet bandwidth conditions.

Other streaming protocols exist that operate essentially by the same principles, that is, the content is divided into smaller segments, representing several seconds of playback, to reduce network bandwidth usage, facilitate retry of data fetches, and to provide adaption to network bandwidth availability. HLS and MPEG-DASH are described by way of example and not limitation.

Streaming content protocols such as those described above typically provide a way to describe the segmented content. One method is to provide a playlist, which is usually—but not always—a text file that lists the Uniform Resource Identifiers (URI) or Uniform Resource Locator (URL) of each segment of a content stream, in the order that the segments should be played. Client devices fetch the playlist from the content server and then use the URIs or URLs to fetch each segment of content. The client device typically fetches the content segments faster than the content can be played back, so that the playback is seamless.

Some content servers may dynamically introduce supplementary or alternative media content (e.g., advertisements, statistics related to a sporting event, additional media content to the main presentation) into a content stream. For example, during client playback of the content stream, the content server can add additional URIs to the playlist file; the URIs may identify a location from which a client device can download a supplementary media file. The client device can be instructed to periodically retrieve from the server one or more updated playlist file(s) in order to access any supplementary or additional (or both) media content the server has introduced.

The content server may operate in either cumulative mode or in rolling mode. In cumulative mode, the server can create a playlist file and append URIs to the end of the playlist file. The client then has access to all parts of the stream from a single playlist file (e.g., a user can start at the middle of a show) when downloaded. In rolling mode, the server may remove URIs identifiers from the beginning of the playlist file on a rolling basis, thereby providing a sliding window of media content accessible to a client device. The server can also add URIs to the end of the playlist. The client device then periodically downloads updated copies of the playlist file to continue viewing the content stream. The rolling basis for playlist downloading can be useful when the content is very long or is unbounded in time (e.g. content from a continuously operated web cam). The client can continue to periodically request the playlist in the rolling mode until it finds an end tag in the playlist.

Bit rate switching may be provided by providing variant streams of the same content. For example, several versions of the content can be stored on the server. Each version can have substantially the same content but be encoded at different bit rates. Typically, each version of the content is represented by a playlist whose URIs point only to segments of content encoded at the same bit rate. This can allow the client device to switch between bit rates depending on, for example, a detection of the available bandwidth, by selecting the appropriate playlist.

Protection features may be provided to protect content against unauthorized use. For example, non-sequential URI numbering may be used to prevent prediction. Encryption of content segments may be used. Partial playlists may be used. Additional and/or different protection features may also be provided.

Figure 1:
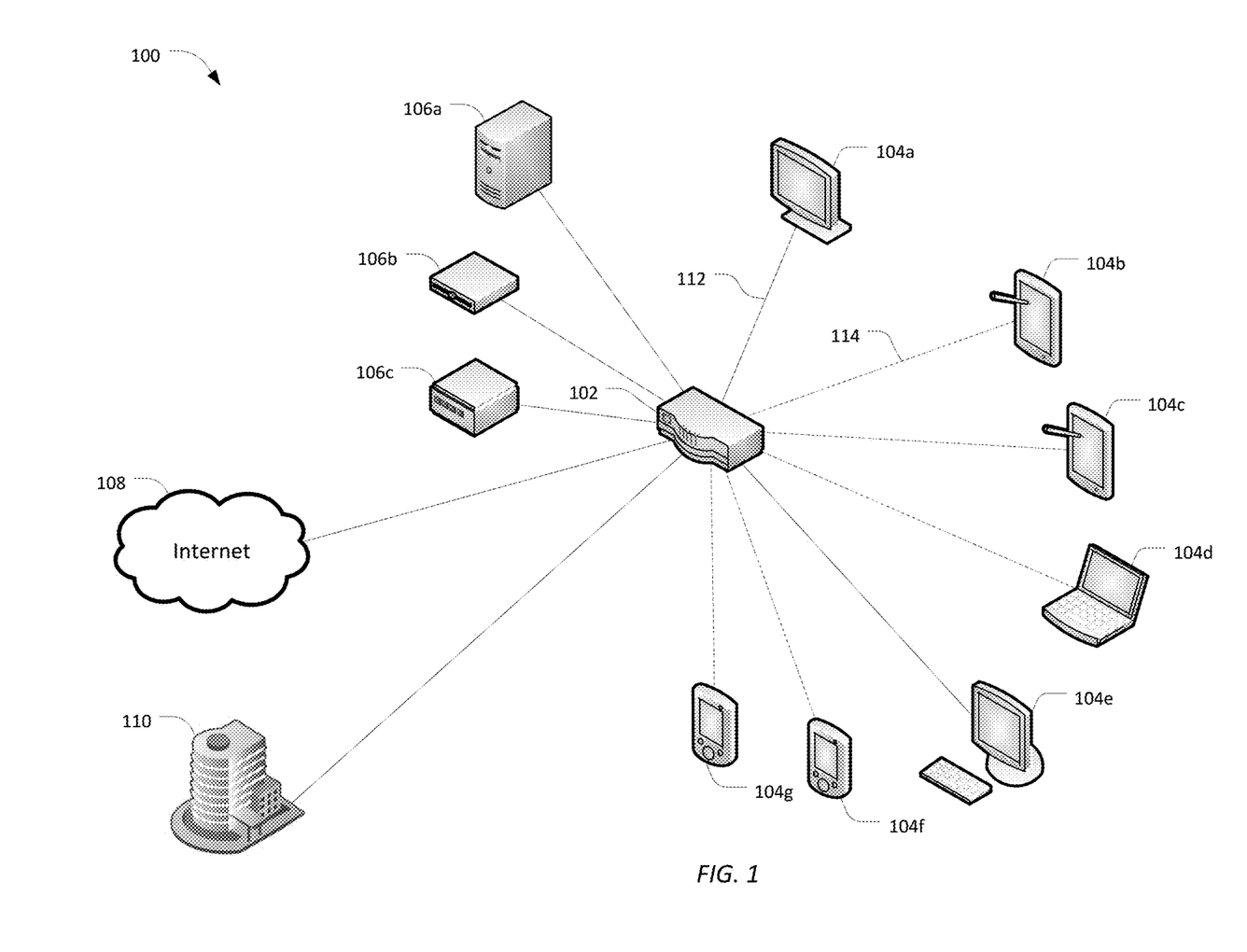
FIG. 1 illustrates one embodiment of a gateway server system for delivering multimedia content to one or more client devices.

FIG. 1 illustrates one embodiment of a gateway server system 100 for delivering multimedia content to one or more client devices 104. The gateway server system 100 comprises a gateway server 102 and one or more client devices 104, and may further comprise one or more media playback devices 106, a network connection to the Internet 108, and/or a connection to a cable service provider 110. The gateway server 102 provides multimedia content to the client devices 104 from local or remote sources, and in this capacity acts as a content server to the client devices 104. The gateway server 102 may comprise, for example, a set top box located within the home. Alternatively, the gateway server 102 may be located in a location remote to the home.

Client devices 104 comprise electronic devices capable of audio and/or video playback. Such devices include, for example, televisions 104*a*, tablet computers 104*b*, 104*c*, laptop computers 104*d*, desktop computers 104*e*, and smart phones 104*f*, 104*g*, among others. The gateway server 102 may provide data to the client devices 104 by wired 112 or wireless 114 connections. Wired 112 connections may be provided by, for example, coaxial cable, fiber optic cable, Category 5 network cable, telephone cable, and any other cable capable of transmitting data. Wireless 114 connections may be provided by various WiFi, WiMAX, UltraWideband, Bluetooth™ and other wireless standards, for example.

The gateway server system 100 may also include one or more media playback devices 106. Media playback devices 106 comprise electronic devices capable of playing recorded audio and/or video media, and/or streaming media from a remote location, and/or generating interactive media, such as video games. Such media playback devices include, for example, content servers 106a, CD/DVD/Blue-Ray™ players 106b, and gaming devices 106c, among others.

The gateway server system 100 may also include a network connection to the Internet 108. The gateway server 102 may use the network connection to the Internet 108 to provide content to the client devices 104 from remote locations. Such remote locations may include, for example: audio streaming services such as Pandora™, Spotify™, Apple iTunes™, and the like; video streaming services such as YouTube™, Netflix™, Amazon Video™, and the like; and websites that provide audio and/or video streaming, among others.

The gateway server system 100 may also included a connection to a cable service provider 110. Cable service providers provide broadcast audio and/or video, on-demand audio and/or video, pay-per-view video, and video rental, among other services. The services provided by a cable operator may also be provided by non-wired systems, such as satellite broadcast systems.

The gateway server 102 delivers multimedia content to one or more client devices 104. Multimedia content comprises audio, such as radio, music, or audio plays, among others; video; or audio and video, such as television programs or movies, among others. Multimedia content may also comprised closed captioning or subtitles, for client devices that support closed captioning or subtitles.

Figure 2:
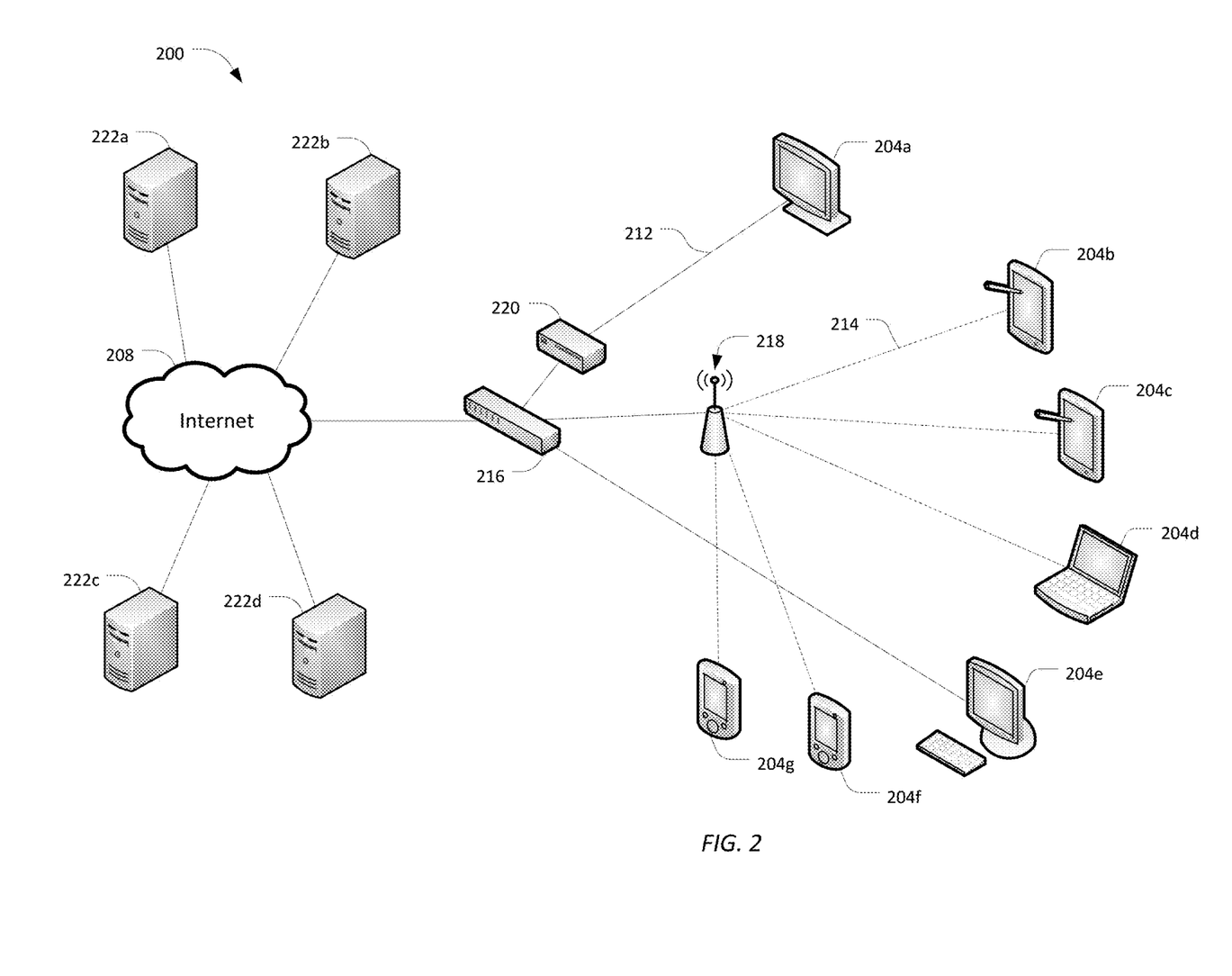
FIG. 2 illustrates one embodiment of a network content distribution system for delivering content to one or more client device.

FIG. 2 illustrates one embodiment of a network content distribution system 200 for delivering content to one or more client devices 204. The network content distribution system 200 describes one method for delivering Internet 208 or remote multimedia content over a network to client devices 204 located at the home, or located wherever the client devices 204 have access to a network connection. The network content distribution system 200 may comprise a modem 216, a wireless access point 218, and one or more client devices 204, and may also comprise a media distribution device 220. The modem 216 provides a communications link to the Internet 208 by way of an Internet Service Provider (ISP). The modem 216 may communicate with the ISP over standard interfaces, such as DSL or coaxial cable, using standard protocols. Some client devices 204e may communicate directly with the modem over a wired 212 connection, or by way of a router or hub (not shown). The wireless access point 218 provides wireless 214 communication between client devices 204 and the modem 216. The wireless access point 218 may employ any of the wireless protocols described above. Client devices comprise electronic devices capable of audio and/or video display such as, for example, televisions 204a, tablet computers 204b, 204c, laptop computers 204d, desktop computers 204e, and smart phones 204f, 204g, among others A media distribution device 220 provides an alternate or additional system for delivering multimedia content to client devices 204. The media distribution device 220 may comprise, for example, a home theatre receiver, a gaming device, or a general purpose computer, among others. The media distribution device 220 may provide wired 212 communications to devices, such as televisions 204a, are not configured for wireless communication.

The network content distribution system 200 provides a method of delivering Internet 208 or remote multimedia content over a network to client devices 204. The multimedia content is provided by one or more content servers 222. The content servers 222 provide multimedia content over the Internet 208 to client devices 204 capable of communicating with the Internet 208. Content providers include, for example: audio streaming services such as Pandora™, Spotify™, Apple iTunes™, and the like; video streaming services such as YouTube™, Netflix™, Amazon Video™, and the like; and websites that provide audio and/or video streaming, among others.

In the systems described above, a client device may initiate delivery of streaming multimedia content from a content source, such as the gateway server 102 or a content server 222. The client device may implement HLS, MPEG-DASH, or a similar streaming protocol, and thus request and download a playlist file for the streaming content. The client device may then periodically re-request the playlist file. The client device may request the playlist either because it is nearing the end of its current copy of the playlist file, it has decided to switch to a content stream encoded at a different bit rate, and/or because it is anticipating that the playlist has changed. Often, however, the client device fetches the playlist file only to find that the playlist has not changed since the last time it fetched the playlist. In such case, fetching the playlist has needlessly occupied network bandwidth between the client device and the content source.

The playlist is usually created, constructed, and/or managed by the content source. The content source, therefore, can track changes to the playlist. The content source can then respond intelligently to requests for the playlist from client devices, and thus reduce unnecessary bandwidth usage.

Some systems are unable to determine whether the playlist has changed. For example, the gateway server system 100 may be streaming content from the Internet 108, and thus the gateway server 102 only acts as a pass-through point for streaming content-related data. The gateway server 102, however, can monitor the playlists, content segment downloads, and playback activity of client devices 104, and use this information to further improve network bandwidth usage.

In various embodiments, throttling content download provides systems and methods for controlling the download of streaming content-related data according to the current status of the playlist and possibly also current bandwidth availability.

In one embodiment, a process may be executed by a content server. The process receives a request for a playlist, where the playlist for streaming content has been requested before. The content server determines whether to send the playlist, for instance by checking whether the playlist has changed since the last time the playlist was requested. The content server then responds to the request accordingly.

In one embodiment, a process may be executed by a gateway server. The process receives a request for streaming content-related data, which may comprise a playlist or a segment of content. The gateway server determines whether to forward the request to the content server that is serving the content by checking whether the requesting client device is in need of more data. The gateway server may also check current bandwidth usage, and allow the request when bandwidth usage is low, even if the requesting device does not imminently need the data. The gateway server will then respond to the request accordingly.

Certain embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present disclosure.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present disclosure.

Figure 3A:
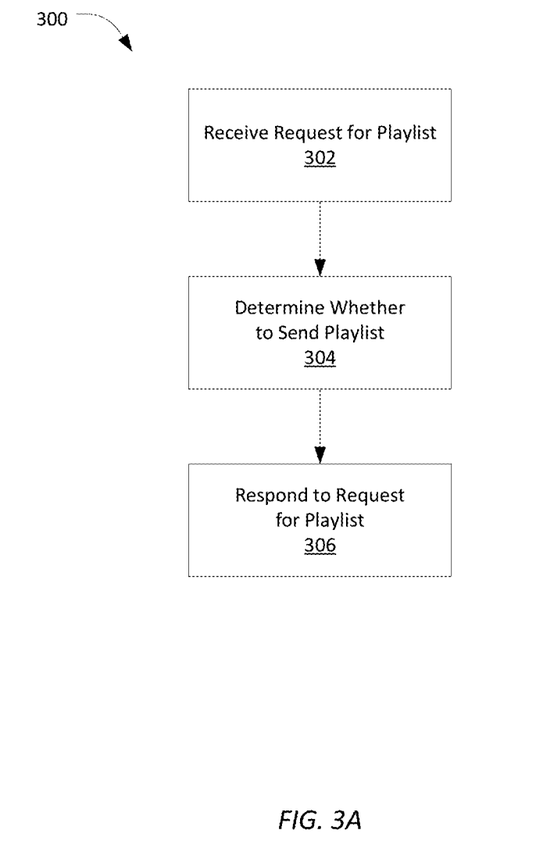
FIG. 3A illustrates one embodiment of a process for throttling download of streaming content-related data.

FIG. 3A illustrates one embodiment of a process 300 for throttling download of streaming content-related data. The process 300 may be employed by a content server, such as the content servers 222 of FIG. 2, or a gateway server acting as a content server, such as the gateway server 102 of FIG. 1. The process 300 of FIG. 3 is initiated when the content server receives 302 a request for a playlist. As discussed above, client devices periodically request the for the content that the client device is streaming. So long as the client device is playing back the same content stream, the client device may continue to request the playlist until the playlist or some other aspect of the streaming protocol indicates the end of the content stream. The client device, however, is unable to determine whether the playlist has changed, and thus may request the playlist even if it does not need it.

The content server that is serving the content to the client device will receive 302 the request for the playlist. The content server creates, builds, and/or manages the playlist for the streaming content, and therefore can track whether the playlist has changed. The content server thus can determine 304 whether to send the requested playlist. Upon determining 304 whether to send the playlist, the content server will respond 306 to the request for the playlist.

Figure 3B:
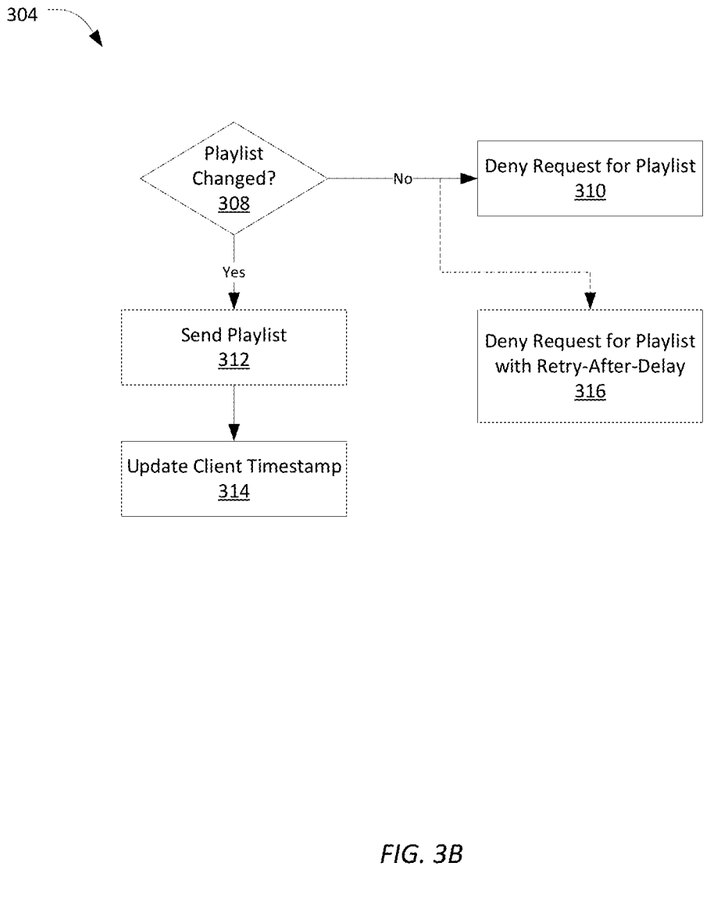
FIG. 3B illustrates one embodiment of the determination process.

FIG. 3B illustrates one embodiment of the determination process 304. The content server tracks when the requesting client device last requested the playlist. For example, the content sever may record an identifier for the client device (e.g. the client device's IP address) and a timestamp at the time the client device requested the playlist. The content server may track requests for each variant of the playlist, so that the process 300 applies even when the client device has chosen to switch bit rates. When the content server receives 302 a request for the playlist, it is able to determine whether the playlist has changed 308 since the last time the client device requested the playlist. When the playlist has changed, the process 304 determines to send 312 the playlist. The process 304 may then update 314 the indicator (e.g., the timestamp) that tracks when the client device last requested the playlist.

When the content server determines that the playlist has not changed 308 since the last time the client device requested it, the content server determines to deny 310 the request for the playlist. Denial 310 may be accomplished by the means provided by the relevant Internet protocol; for example, the content server may send a standard HTTP "No Response 204" status code.

Alternatively, the content server may determine to deny the request with a retry-after-delay 116. The retry-after-delay allows the content server to indicate to the client device when the client device should try its request again. The content server can employ retry-after-delays to balance its outgoing bandwidth to multiple client devices. The retry delay can be in seconds, at an absolute time, and/or at a relative time, depending on what the relevant Internet protocol provides. For example, the content server may send a standard HTTP "Not Modified 304" status code along with a retry-after header.

The process 300, 304 of FIGS. 3A and 3B may be implemented by a content server when the content server is aware of changes to the playlist. Similar mechanisms can be employed to improve bandwidth usage by a server that is not aware of changes to the playlist.

Figure 4A:
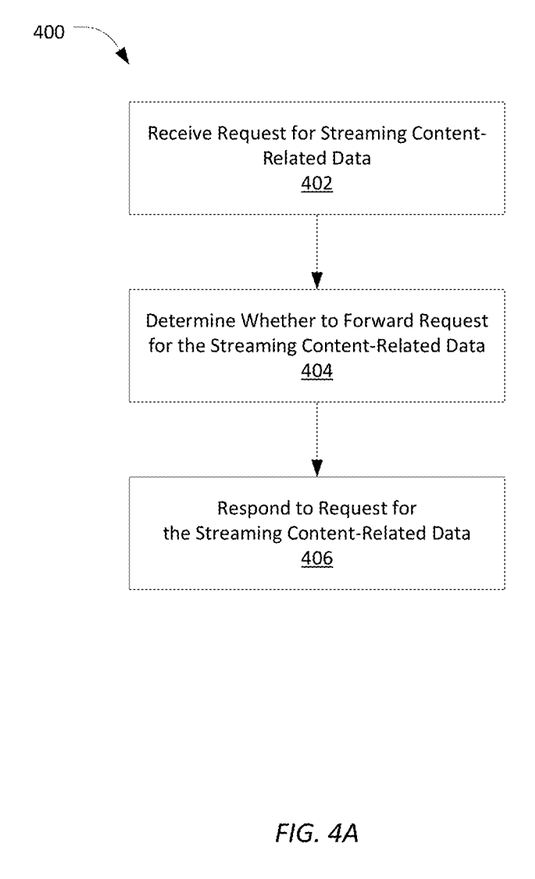
FIG. 4A illustrates one embodiment of a process for throttling download of streaming content-related data.

FIG. 4A illustrates one embodiment of a process 400 for throttling download of streaming content-related data. The process 400 may also be employed by the gateway server 102 of FIG. 1 when the gateway server 102 is acting as a distribution point for streaming content being served elsewhere. When the gateway server 102 is acting only as a distribution point, it is unaware of changes a playlist, but can use the playlist to manage bandwidth between itself and various client devices 104, media playback devices 106, and the Internet 108.

As illustrated in FIG. 4A, the process 400 is initiated when the gateway server receives 402 a request for streaming content-related data. As explained with respect to FIG. 4B, streaming content-related data may be a playlist or segments of data from the streaming content. Also as discussed above, client devices periodically request the playlist for the content that the client device is streaming. So long as the client device is playing back the same content stream, the client device may continue to request the playlist until the playlist or some other aspect of the streaming protocol indicates the end of the content stream. The gateway server may track the last time the client received the playlist, and possibly also the client's current position within the playlist, based on the last segment of data the client fetched. The gateway server may also track the amount of content the client device currently has in its buffer, where amount may mean the quantity of data and/or the amount of playback time. The gateway server may also track the client device's current place within its buffer, that is, where it is in playing the content. As illustrated in FIG. 4A, this information may allow the gateway server to determine 404 whether to forward the request from the client device to the content server. Upon determining 404 whether to forward the request, the content server will respond to the request 406.

Figure 4B:
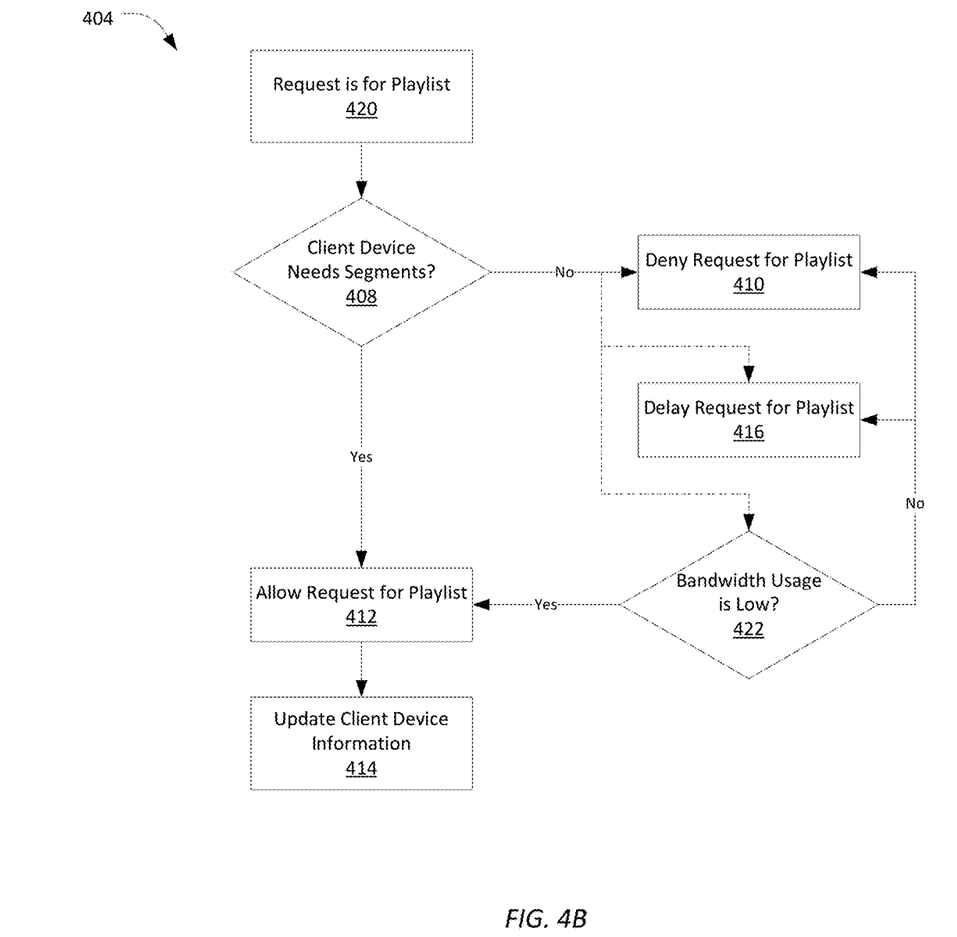
FIG. 4B illustrates one embodiment of the determination process when the requested streaming content-related data is the playlist.

FIG. 4B illustrates one embodiment of the determination process 404 when the requested streaming content-related data is the playlist 420. The gateway server may wish to throttle requests for playlists in order to manage bandwidth usage between itself and client devices and between itself and content sources. When the gateway server receives 402 a request for the playlist 420, it uses the tracked information about the requesting client device to determine whether the client device is in need of more segments of content 408. This determination can be based on a number of different factors. For example, the gateway server may be aware of the client device's current place in the client device's current copy of the playlist; this may indicate that the client device is at or near the end of the playlist. Alternatively or additionally, the gateway server may be aware of the amount of data in the client's buffer and the client's current playback location within the buffer; this information may indicate how much playback time the client presently has.

Once the gateway server has determined that the client device needs more segments of content to continue to play the content uninterrupted, the gateway server will allow 412 the request for the playlist to proceed to the content server. The gateway server may also update 414 its tracked information for the client, for example by updating the last time the client device fetched the playlist.

When the gateway server determines that the client device does not need more content segments, the gateway server may determine to deny 410 the request for the playlist. Denial 410 may be accomplished by the means provided by the relevant Internet protocol; for example, the content server may send a standard HTTP "No Response 204" status code. The request is not forwarded to the content server, thus reducing unnecessary bandwidth usage.

Alternatively, the gateway server may be configured to delay 416 the request for the playlist. Delaying 416 the request for the playlist has a similar effect as denying 410 the request, though the client device may be instructed to retry the request at a later time, or the request may be held by the gateway server until an opportune time to forward it to the content server.

Another alternative is for the gateway server to check the current bandwidth usage 422. When overall bandwidth usage on either or both the client device side and the Internet side is low, the gateway server may allow 412 the request for the playlist even when the client device is not in imminent need 408 of more content segments. When the overall bandwidth usage is not low, however, the gateway server may delay 416 or deny 410 the request so that another device can make use of the available bandwidth.

Figure 4C:
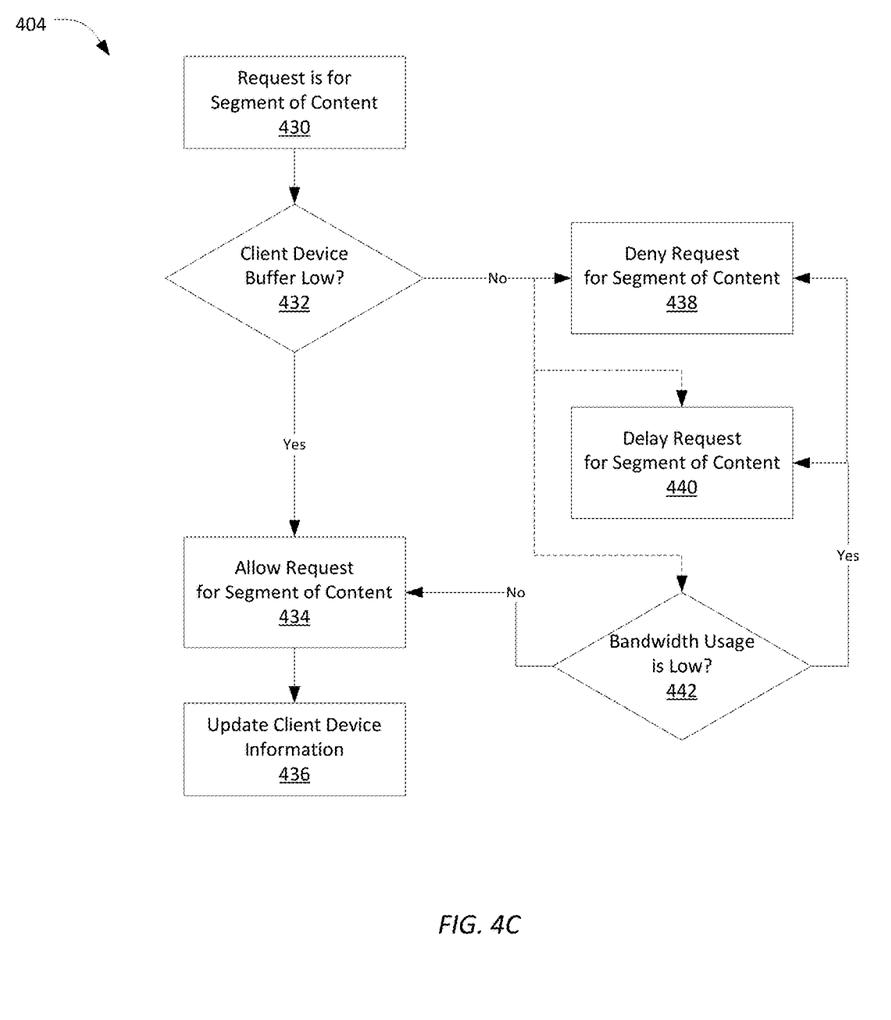
FIG. 4C illustrates one embodiment of the determination process when the requested streaming content-related data is a segment of the content.

FIG. 4C illustrates one embodiment of the determination process 404 when the requested streaming content-related data is a segment of the content 430. The gateway server may wish to throttle requests for content segments in order to manage bandwidth usage between itself and client devices and between itself and content sources. In this way, the gateway server attempts to give all client devices equal bandwidth usage. When the gateway server receives 402 a request for a content segment 430, it uses the tracked information about the requesting client device to determine whether the client device's content buffer is running low 432. This determination can be based on the amount of data in the client's buffer and the client's current playback location within the buffer. The gateway server may be configured with a threshold, for example 5 or 10 seconds, that establishes the minimum amount of data the buffer may contain.

Once the gateway server has determined that the client device's buffer is too low to continue to play uninterrupted, the gateway server will allow 434 the request for the content segment to proceed to the content server. The gateway server may also update 436 its tracked information for the client, for example by updating the amount of data the client device now has in its buffer.

When the gateway server determines that the client device's buffer is not too low, the gateway server may determine to deny 438 the request for the content segment. Denial 438 may be accomplished by the means provided by the relevant Internet protocol; for example, the content server may send a standard HTTP "No Response 204" status code. The request is not forwarded to the content server, thus reducing unnecessary bandwidth usage.

Alternatively, the gateway server may be configured to delay 440 the request for the content segment. Delaying 440 the request for the content segment has a similar effect as denying 438 the request, though the client device may be instructed to retry the request at a later time, or the request may be held by the gateway server until an opportune time to forward it to the content server.

Another alternative is for the gateway server to check the current bandwidth usage 442. When the overall bandwidth usage on either or both the client device side or the source side is low, the gateway server may allow 434 the request for the content segment even when the client device is not about to deplete its buffer. When the overall bandwidth usage is not low, however, the gateway server may delay 440 or deny 438 the request so that another device can make use of the available bandwidth.

It is understood that the above described embodiments are given as examples and not limitations. One skilled in the art will recognized that any and all of the above described embodiments may be combined in a number of different ways.

While various details have been set forth in the foregoing description, it will be appreciated that the various aspects of the systems and methods for throttling content download may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect.

Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for various aspects of the systems and methods for throttling content download, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. Those skilled in the art will recognize, however, that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

What is claimed is:

1. A computer-implemented method for controlling content download in streaming content delivery, comprising:
    receiving a request for a playlist for streaming content at a content server from a client, the client being remote from the content server;
    determining at the content server whether to send the playlist; and
    responding at the content server to the request for the playlist,
    wherein determining whether to send the playlist comprises determining whether the playlist has changed since a last request for the playlist for the streaming content and whether an outgoing bandwidth load of the content server is over a threshold.

2. The computer-implemented method of claim 1, wherein the streaming content is transmitted by HTTP Live Streaming or MPEG-DASH.

3. The computer-implemented method of claim 1, wherein the request is for a different bitrate variant playlist for the streaming content since the last request for the playlist for the streaming content, wherein the determining whether the playlist has changed since the last request for the playlist for the streaming content further comprises determining the request is for a different bitrate variant playlist for the streaming content; and wherein sending the playlist includes sending the different bitrate variant playlist for the streaming content.

4. The computer-implemented method of claim 1, wherein the responding to the request for the playlist when the outgoing bandwidth load is over a threshold comprises sending the playlist when it is determined that the playlist has changed since the last request for the playlist for the streaming content.

5. The computer-implemented method of claim 1, wherein the responding to the request for the playlist when the outgoing bandwidth load is over the threshold comprises denying the request when it is determined that the playlist has not changed since the last request for the playlist for the streaming content.

6. The computer-implemented method of claim 5, wherein denying the request further comprises responding with retry-after-a-delay.

7. The computer-implemented method of claim 6, wherein the delay is based on available bandwidth.

8. An apparatus for controlling content download in streaming content delivery, comprising:
 a processor; and
 a memory coupled to the processor, wherein the memory stores program instructions, which when executed from the memory cause the processor to:
  receive a request for a playlist for streaming content at a content server from a client, the client being remote from the content server;
  determine at the content server whether to send the playlist; and
  respond at the content server to the request for the playlist,
  wherein determining whether to send the playlist comprises determining whether the playlist has changed since a last request for the playlist for the streaming content and whether an outgoing bandwidth load of the content server is over a threshold;
  wherein the apparatus is a content server.

9. The apparatus of claim 8, wherein the request is for a different bitrate variant playlist for the streaming content since the last request for the playlist for the streaming content, wherein the determining whether the playlist has changed since the last request for the playlist for the streaming content further comprises determining the request is for a different bitrate variant playlist for the streaming content; and wherein sending the playlist includes sending the different bitrate variant playlist for the streaming content.

10. The apparatus of claim 8, wherein the responding to the request for the playlist when the outgoing bandwidth load is over a threshold comprises sending the playlist when it is determined that the playlist has changed since the last request for the playlist for the streaming content.

11. The apparatus of claim 8, wherein the responding to the request for the playlist when the outgoing bandwidth load is over the threshold comprises denying the request when it is determined that the playlist has not changed since the last request for the playlist for the streaming content.

12. The apparatus of claim 11, wherein denying the request further comprises responding with retry-after-a-delay.

13. The apparatus of claim 12, wherein the delay is based on available bandwidth.

14. The apparatus of claim 8, wherein the streaming content is transmitted by HTTP Live Streaming or MPEG-DASH.

15. A computer program product for context extraction from controlling content download in streaming content delivery, the computer program product comprising: a non-transitory computer-readable storage medium having program instructions embodied therewith, the program instructions executable by a computer to cause the computer to perform a method, comprising:
 receiving a request for a playlist for streaming content at a content server from a client, the client being remote from the content server;
 determining at the content server whether to send the playlist; and
 responding at the content server to the request for the playlist, wherein determining whether to send the playlist comprises determining whether the playlist has changed since a last request for the playlist for the streaming content and whether an outgoing bandwidth load of the content server is over a threshold.

16. The computer program product of claim 15, wherein the request is for a different bitrate variant playlist for the streaming content since the last request for the playlist for the streaming content, wherein the determining whether the playlist has changed since the last request for the playlist for the streaming content further comprises determining the request is for a different bitrate variant playlist for the streaming content; and wherein sending the playlist includes sending the different bitrate variant playlist for the streaming content.

17. The computer program product of claim 15, wherein the responding to the request for the playlist when the outgoing bandwidth load is over a threshold comprises sending the playlist when it is determined that the playlist has changed since the last request for the playlist for the streaming content.

18. The computer program product of claim 15, wherein the responding to the request for the playlist when the outgoing bandwidth load is over the threshold comprises denying the request when it is determined that the playlist has not changed since the last request for the playlist for the streaming content.

19. The computer program product of claim 18, wherein denying the request further comprises responding with retry-after-a-delay.

20. The computer program product of claim 15, wherein the streaming content is transmitted by HTTP Live Streaming or MPEG-DASH.

* * * * *